United States Patent
Brigham

(10) Patent No.: US 12,504,109 B2
(45) Date of Patent: Dec. 23, 2025

(54) APPARATUS AND METHOD FOR SEALING AN END CAP ON AN INSULATED PIPE SYSTEM

(71) Applicant: Integrity Products and Supplies Inc., Sherwood Park (CA)

(72) Inventor: Graham Brigham, Sherwood Park (CA)

(73) Assignee: Integrity Products and Supplies Inc., Sherwood Park (CA)

( * ) Notice: Subject to any disclaimer, the term of this patent is extended or adjusted under 35 U.S.C. 154(b) by 1169 days.

(21) Appl. No.: 17/155,245

(22) Filed: Jan. 22, 2021

(65) Prior Publication Data
US 2022/0228696 A1    Jul. 21, 2022

(30) Foreign Application Priority Data
Jan. 20, 2021   (CA) .................................. 3,106,266

(51) Int. Cl.
*F16L 59/16*    (2006.01)

(52) U.S. Cl.
CPC .......... *F16L 59/166* (2013.01); *F16L 59/168* (2013.01)

(58) Field of Classification Search
CPC ........ F16L 59/166; F16L 59/168; F16J 15/10; F16J 15/104
See application file for complete search history.

(56) References Cited

U.S. PATENT DOCUMENTS 4,205,707 A * 6/1980 Lundgren ............. F16L 57/005
138/96 T
2017/0261137 A1* 9/2017 Williams ............... F16L 19/103

FOREIGN PATENT DOCUMENTS

WO    WO-2009054534 A1 * 4/2009 ............ F16L 19/065

* cited by examiner

*Primary Examiner* — Gilbert Y Lee
(74) *Attorney, Agent, or Firm* — Finch & Maloney PLLC

(57) ABSTRACT

An apparatus and method for sealing an end cap on an insulated pipe system is provided. A flexible body having a top, a bottom, a first side and a second side acts to prevent the ingress of moisture into an insulated pipe system at the connection between the end cap and the pipe. The top of the flexible body has an end cap receiver. The bottom of the flexible body circumferentially engages the pipe. The flexible body is sealable to the pipe by a sealant. The end cap receiver accepts an edge of an end cap. A flexible band circumferentially engages the flexible body to hold the flexible body on the pipe.

19 Claims, 4 Drawing Sheets

APPARATUS AND METHOD FOR SEALING AN END CAP ON AN INSULATED PIPE SYSTEM

FIELD OF THE DISCLOSURE

The present application relates generally to an apparatus and method for sealing an end cap on an insulated pipe system.

BACKGROUND

This section provides background information to facilitate a better understanding of the various aspects of the invention. It should be understood that the statements in this section of this document are to be read in this light, and not as admissions of prior art.

It can be beneficial in many different climates and applications to wrap a pipe in insulation and cladding. The purpose varies from helping to keep a pipe warm to protecting personnel from hot pipes. There are, however, often issues related to the ingress of moisture into these insulated systems. Moisture can cause the insulation to lose its thermal performance or cause corrosion under the insulation which damages the pipes.

End caps are a common part of the insulated pipe system to help prevent the ingress of moisture. It is common for the connection point between the end cap and the piping to be sealed with silicon. It is common for the silicon to breakdown over time and this breakdown is often sped up by the elements such as snow, wind, rain, heat, sun, and others. When the silicon seal breaks down, moisture may seep past the connection point between the end cap and pipe, causing damage to the insulated pipe system.

BRIEF SUMMARY

There is provided an apparatus for sealing an end cap on an insulated pipe system. A flexible body has a top, a bottom, a first side and a second side. The top of the flexible body has an end cap receiver. The bottom of the flexible body circumferentially engages a pipe. The flexible body is sealable to the pipe by a sealant. The end cap receiver accepts an edge of an end cap. A flexible band is provided that circumferentially engages the flexible body to hold the flexible body on the pipe.

In one embodiment, the top of the flexible body has a band groove positioned adjacent a first side of the flexible body for receiving the flexible band. The flexible band is sized to fit within the band groove.

In one embodiment, the end cap receiver is positioned adjacent the second side of the flexible body.

In one embodiment, the end cap receiver has at least one tooth to hold, or potentially lock, the end cap within the end cap receiver.

In another embodiment, the end cap receiver has three teeth to hold the end cap within the end cap receiver. The teeth may be positioned on either a first wall or a second wall and in one embodiment, two teeth are positioned on the first wall and one tooth is positioned on the second wall of the end cap receiver.

In one embodiment, the bottom of the flexible body circumferentially engages the pipe such that the second side of the flexible body is positioned within the insulated pipe system when the end cap is positioned on a cladding of the insulated pipe system.

In one embodiment, the flexible body is made of silicon, plastic, rubber or metal. It will be understood by a person skilled in the art that other suitable materials may also be used.

In one embodiment, the flexible band is made of metal, rubber or plastic. It will be understood by a person skilled in the art that other suitable materials may also be used.

In one embodiment, the sealant seals both the first side and the second side of the flexible body to the pipe.

In one embodiment, the sealant is silicon. It will be understood by a person skilled in the art that other suitable materials may also be used.

There is also provided a method of sealing an end cap on an insulated pipe system. An apparatus for sealing an end cap on an insulated pipe system is provided. The apparatus has a flexible body that has a top, a bottom, a first side and a second side. The top of the flexible body has an end cap receiver. The bottom of the flexible body circumferentially engages around a pipe. The flexible body is sealable to the pipe by a sealant. The end cap receiver accepts an edge of an end cap. A flexible band is provided that circumferentially engages the flexible body to hold the flexible body on the pipe. The flexible body is positioned around the pipe adjacent to an insulation and a cladding such that the end cap receiver is engageable by the end cap when the end cap engages the cladding. The flexible band is positioned around the flexible body for holding the flexible body around the pipe. Sealant is utilized on the first side and the second side of the flexible body to seal the flexible body to the pipe. The end cap is positioned within the end cap receiver such that it engages the end cap receiver and the cladding.

In one embodiment, the top of the flexible body has a band groove positioned adjacent a first side of the flexible body for receiving the flexible band. The flexible band being sized to fit within the band groove.

In one embodiment, the end cap receiver is positioned adjacent the second side of the flexible body.

In one embodiment, a further step of using sealant in the end cap receiver is completed. This adds an additional seal against the ingress of moisture.

In one embodiment, the end cap receiver has at least one tooth to hold the end cap within the end cap receiver.

In another embodiment, the end cap receiver has three teeth to hold the end cap within the end cap receiver. The teeth may be positioned on either a first wall or a second wall and in one embodiment, two teeth are positioned on the first wall and one tooth is positioned on the second wall of the end cap receiver.

In one embodiment, the bottom of the flexible body circumferentially engages around the pipe such that the second side of the flexible body is positioned next to or in contact with the insulated pipe system when the end cap is positioned on a cladding of the insulated pipe system.

In one embodiment, the flexible body is made of silicon, plastic, rubber or metal. It will be understood by a person skilled in the art that other suitable materials may also be used.

In one embodiment, the flexible band is made of metal, rubber or plastic. It will be understood by a person skilled in the art that other suitable materials may also be used.

In one embodiment, the sealant seals both the first side and the second side of the flexible body to the pipe.

In one embodiment, the sealant is silicon. It will be understood by a person skilled in the art that other suitable materials may also be used.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
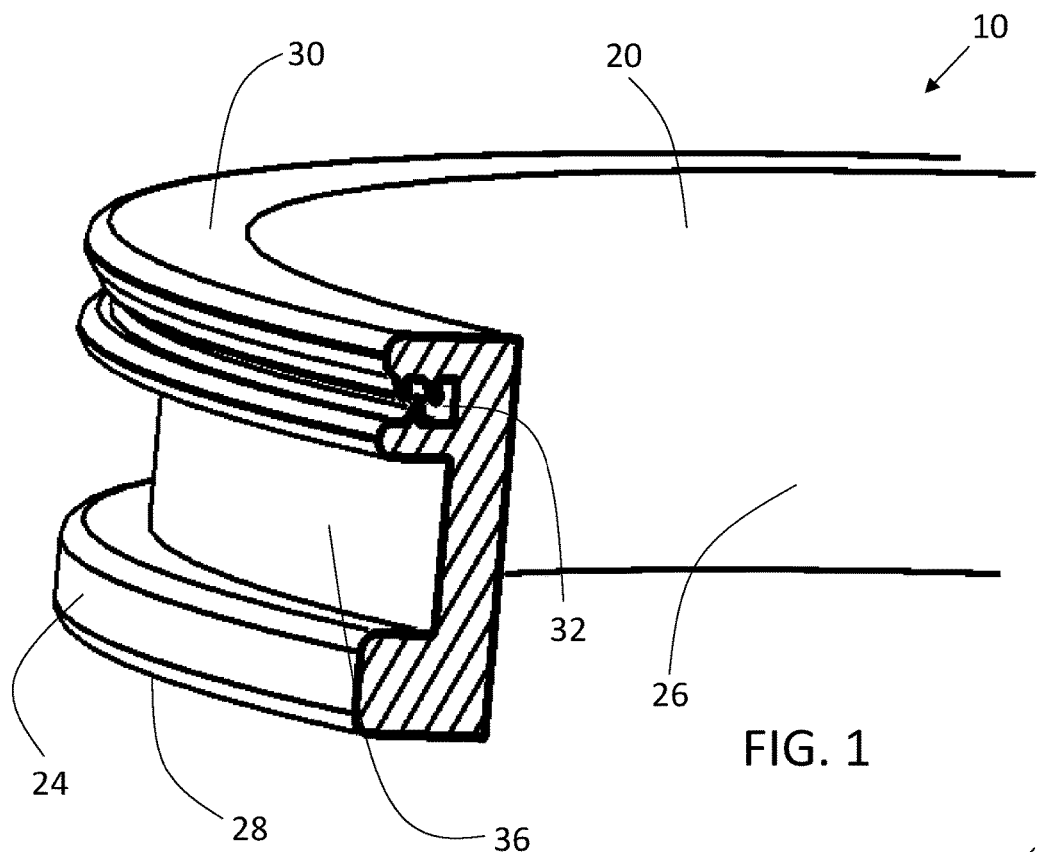
FIG. 1 is a perspective view, partially in section, of a flexible body.

An apparatus for sealing an end cap on an insulated pipe system, generally identified by reference numeral 10, will now be described with reference to FIG. 1 through FIG. 7.

Figure 3:
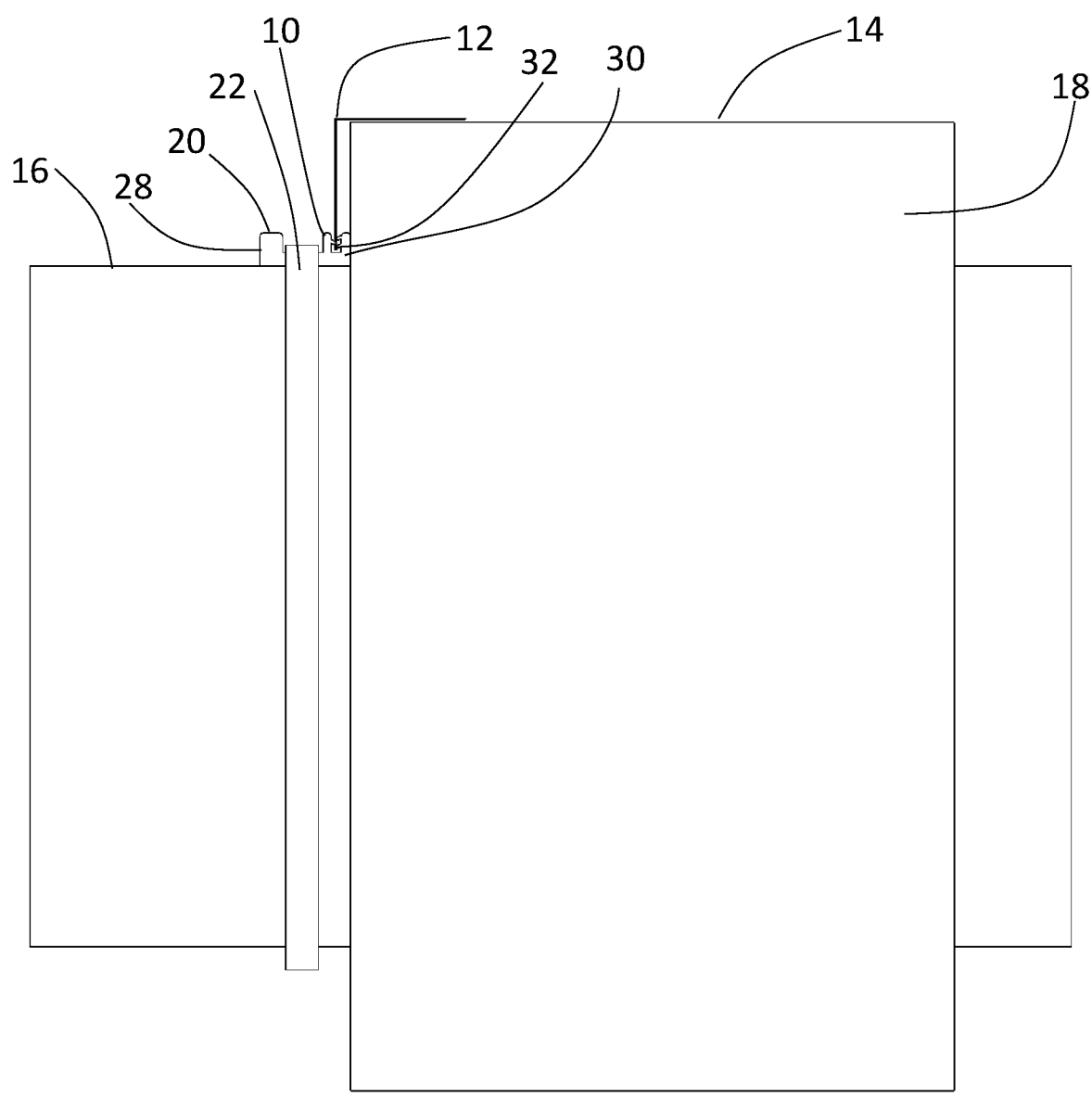
FIG. 3 is a side elevation view, partially in section, of the apparatus on a pipe system.
Figure 5:
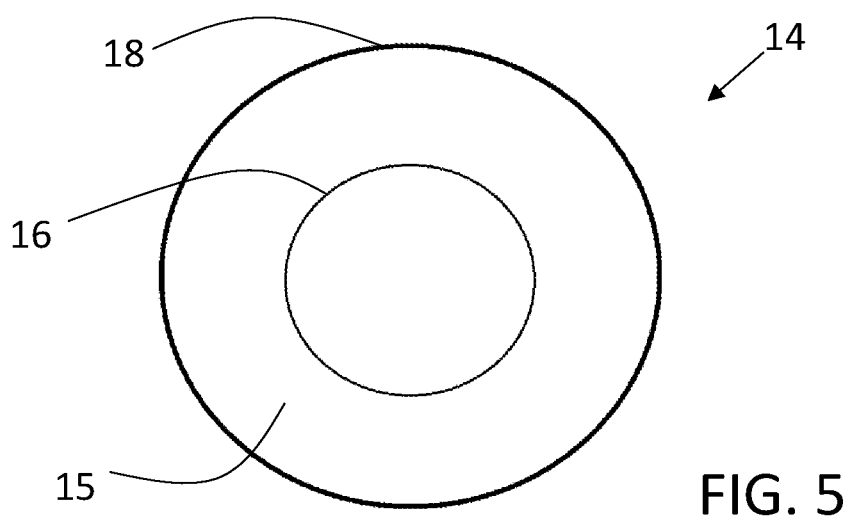
FIG. 5 is an end view, in section, of an insulated pipe system.
Figure 6:
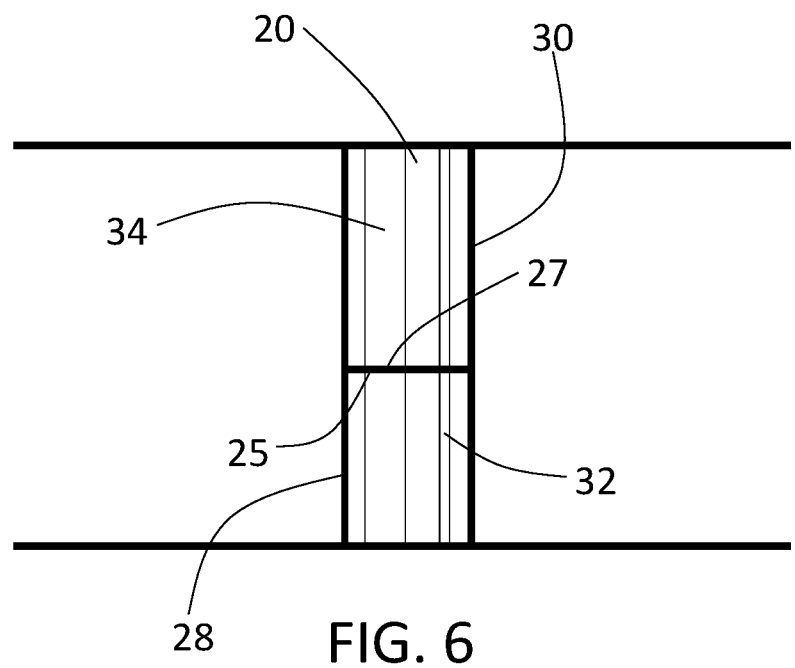
FIG. 6 is a side elevation view of the flexible body on a pipe.
Figure 7:
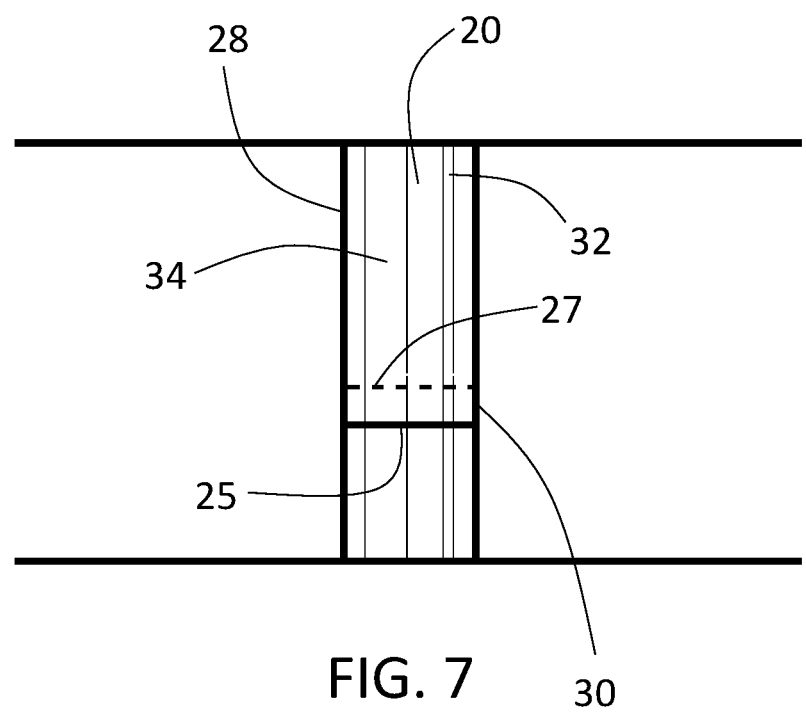
FIG. 7 is a side elevation view, partially in section, of the flexible body on a pipe.

Referring to FIG. 3, an apparatus 10 is used to provide a seal between an end cap 12 of an insulated pipe system 14. Referring to FIG. 5, insulated pipe systems 14 have insulation 15 that wraps around a pipe 16 and is enclosed within cladding 18. A person of skill in the art will understand that spacer wraps, low point drains and other elements may also be included within insulated pipe system 14. Referring to FIG. 3, an end cap 12 is used to cap the cladding 18 to help prevent the ingress of moisture into the insulated pipe system 14 which could damage the insulation 15, shown in FIG. 5, and pipe 16.

Figure 2:
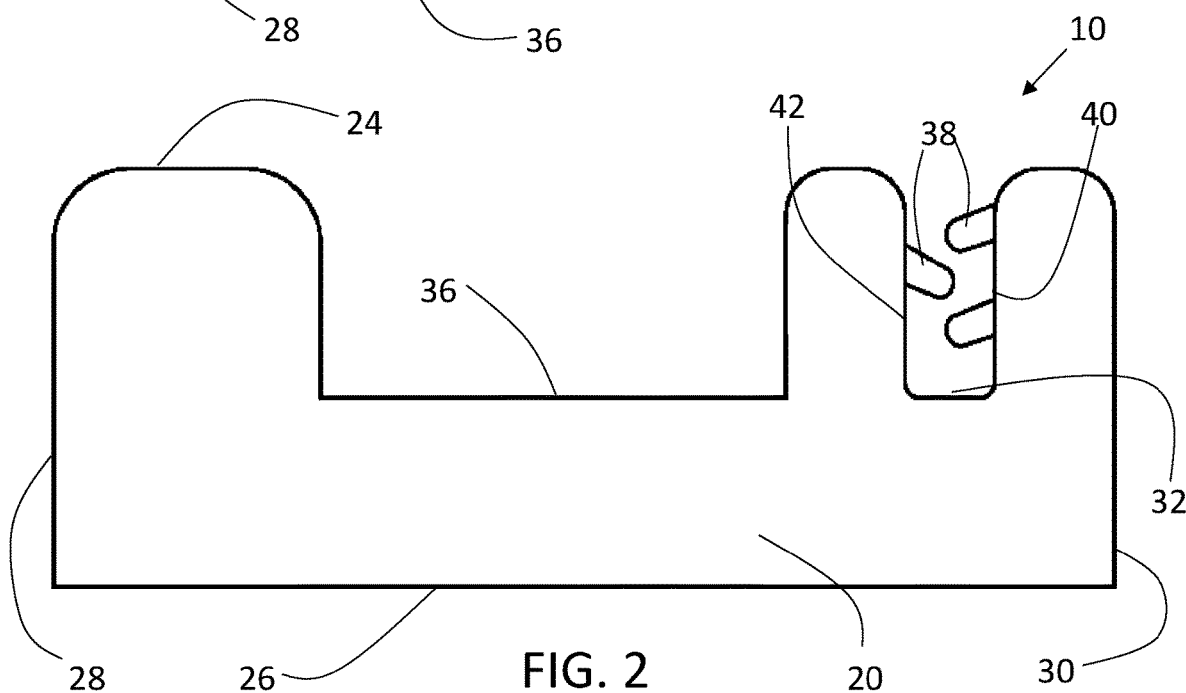
FIG. 2 is a side elevation view, in section, of the flexible body shown in FIG. 1.
Figure 4:
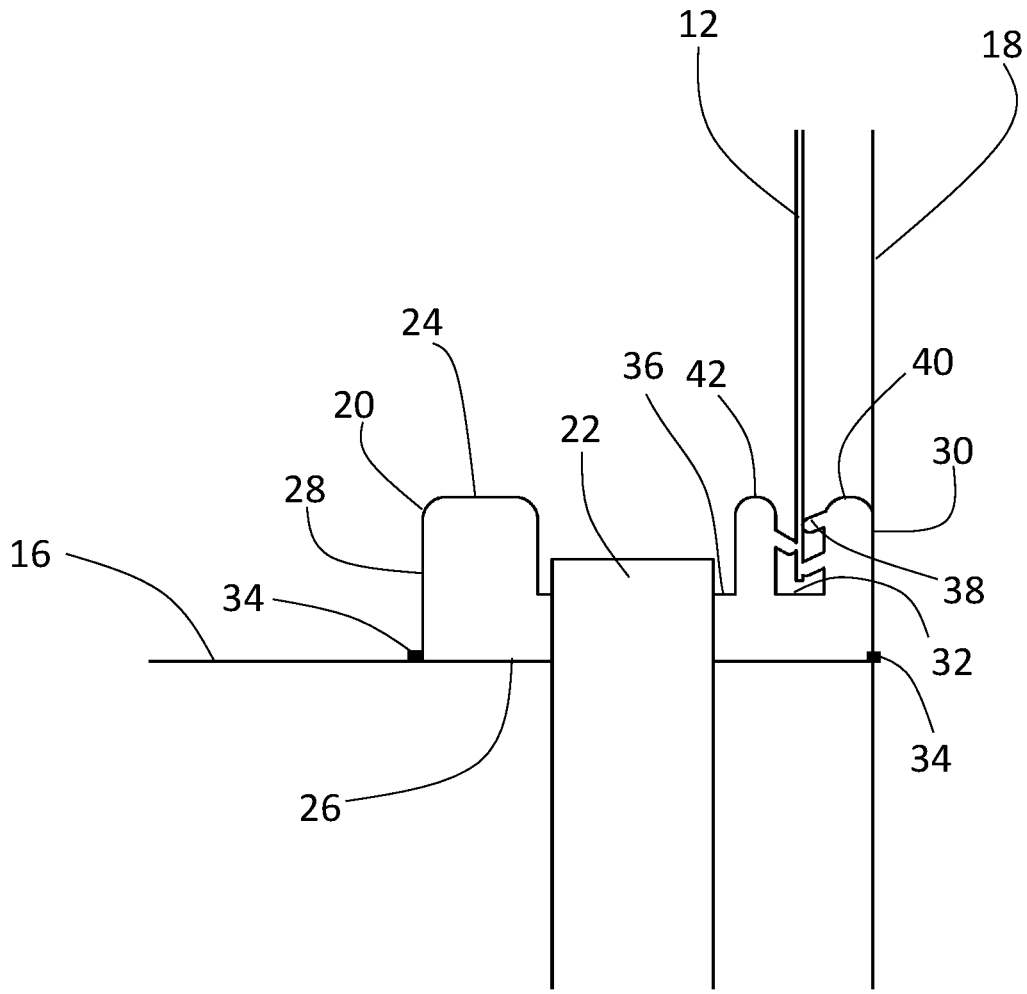
FIG. 4 is a detailed view of the apparatus on a pipe system shown in FIG. 3.

Referring to FIG. 4, apparatus 10 has a flexible body 20 which is held onto pipe 16 by a flexible band 22. Flexible body 20 is made of a flexible material such as silicon, plastic, rubber or metal. Flexible band 22 is made of a flexible material such as metal, plastic or rubber. It will be understood by a person skilled in the art that flexible body 20 and flexible band 22 may be made of any other suitable material known to a person skilled in the art. Referring to FIG. 1 and FIG. 2, flexible body 20 has a top 24, a bottom 26, a first side 28 and a second side 30. Top 24 of flexible body 20 has an end cap receiver 32. Bottom 26 of flexible body 20 circumferentially engages pipe 16. Referring to FIG. 4, flexible body 20 is sealable to pipe 16 by a sealant 34. Sealant 34 may be silicon or any other suitable sealant known to a person skilled in the art. The type of sealant 34 may depend on the temperature of pipe 16. For example, RTV (room temperature vulcanizing) silicon or high temperature RTV silicon sealant may be used in appropriate circumstances. Sealant 34 may be used on bottom 26, first side 28, second side 30 or any combination of these for sealing flexible body 20 to pipe 14. In a preferred embodiment, first side 28 and second side 30 are sealed by sealant 34. In the embodiment shown in FIG. 6, a first end 25 and a second end 27 of flexible body 20 are positioned in contact with each other when bottom 26 of flexible body 20 circumferentially engages pipe 16. Sealant 34 may be used along the first end 25 and the second end 27 to provide further sealing. In the embodiment shown in FIG. 7, first end 25 overlaps second end 27 of flexible body 20 when bottom 26 of flexible body 20 circumferentially engages pipe 16. Sealant may be used along the first end 25, the second end 27 or both the first end 25 and the second end 27 to provide further sealing. Referring to FIG. 4, end cap receiver 32 accepts an edge of end cap 12. Flexible band 22 circumferentially engages flexible body 20 to hold flexible body 20 on pipe 16.

Referring to FIG. 4, in the embodiment shown, flexible body 20 has a band groove 36 positioned adjacent first side 28 of flexible body 20 for receiving flexible band 22. Flexible band 22 is sized to fit within band groove 36. Band groove 36 acts as a guide to maintain flexible band 22 in circumferential engagement with flexible body 20 along the entire length of flexible body 20 and aids in preventing flexible band 22 from sliding off first side 28 or second side 30 of flexible body 20.

In the embodiment shown, end cap receiver 32 is positioned adjacent second side 30 of flexible body 20. It will be understood by a person skilled in the art that end cap receiver 32 may be positioned anywhere on top 24 of flexible body 20. End cap receiver 32 must be positioned in such a way that flexible band 22 may circumferentially engage flexible body 20 without impeding access to end cap receiver 32 by end cap 12.

Referring to FIG. 2, in the embodiment shown, end cap receiver 32 has three teeth 38 used to hold end cap 12 within end cap receiver 32. It will be understood by a person skilled in the art that the number of teeth 38 may vary from none to a plurality. In the embodiment shown, two teeth 38 are positioned on a first wall 40 of end cap receiver 32 and one tooth 38 is positioned on a second wall 42 of end cap receiver 32. It will be understood by a person skilled in the art that the number of teeth on each of first wall 40 and second wall 42 may vary. It is preferable that teeth 38 hold end cap 12 through friction, however it is possible to have teeth that hold end cap 12 by puncturing end cap 12 if end cap 12 is pulled upwards in an attempt to remove end cap 12.

Referring to FIG. 3, in the embodiment shown, flexible body 20 circumferentially engages pipe 16 such that second side 30 of flexible body 20 is positioned within insulated pipe system 14 when end cap 12 is positioned on cladding 18 of insulated pipe system 14. This results in second side 30 of flexible body 20 being sealed within insulated pipe system 14 where second side 30 is sheltered from weather and other elements acting upon second side 30. It will be understood by a person skilled in the art that first side 28 of flexible body 20 may be positioned within insulated pipe system 14 where first side 28 is sheltered from weather and other elements acting upon first side 28.

When in use, flexible body 20 is positioned around pipe 16 adjacent to the edge of insulation 15, shown in FIG. 5, and cladding 18 such that end cap receiver 32 is engageable by end cap 12 when end cap 12 engages cladding 18 to cap insulated pipe system 14. Flexible band 22 is positioned around flexible body 20 between first side 28 and second side 30, or in band groove 36 when present, to hold flexible body 20 around pipe 16. Flexible band 22 may be glued to itself to hold it together, ratcheted, removably attached or attached to itself in any method known to a person skilled in the art. While a permanent method is preferred, removable methods are acceptable. It is preferable that sealant 34 is used on both first side 28 and second side 30 of flexible body 20 to seal flexible body 20 to pipe 16. It will be understood that sealant 34 used on bottom 26, first side 28 and/or second side 30 of flexible body 20 may be appropriate. It is preferred that sealant 34 be positioned on the side of flexible body 20 that is positioned within insulated pipe system 18 when capped by end cap 14. To provide additional sealing properties, end cap receiver 32 may be filled with sealant 34 prior to end cap 14 being positioned within end cap receiver 32. When sealant 34 is used in end cap receiver 32, end cap 14 should be inserted prior to sealant 34 drying. After flexible body 20 has been sealed with sealant, end cap 12 is positioned within end cap receiver 32 of flexible body 20 such that it engages end cap receiver 32 and cladding 18.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. An apparatus for sealing an end cap on an insulated pipe system, comprising:
    a flexible body having a top, a bottom, a first side and a second side, the top of the flexible body having an end cap receiver and a band groove, the band groove being positioned adjacent the first side of the flexible body, the bottom of the flexible body circumferentially engaging an exterior surface of a pipe, the flexible body being sealable to the pipe by a sealant, the end cap receiver accepting an edge of the end cap;
    a flexible band, the flexible band circumferentially engaging the band groove of the flexible body to hold the flexible body on the pipe, the flexible band being sized to fit within the band groove; and
    the end cap receiver having a first wall and a second wall, the first wall being positioned adjacent the second side of the flexible body and the second wall being positioned between the band groove and the first wall such that the edge of the end cap is slidable between the first wall and the second wall.

2. The apparatus of claim 1 wherein the end cap receiver has at least one tooth to hold the end cap within the end cap receiver.

3. The apparatus of claim 2 wherein the end cap receiver has three teeth to hold the end cap within the end cap receiver.

4. The apparatus of claim 3 wherein two teeth are positioned on the first wall of the end cap receiver and one tooth is positioned on the second wall of the end cap receiver.

5. The apparatus of claim 1 wherein the bottom of the flexible body circumferentially engaging the pipe such that the second side of the flexible body is positioned within the insulated pipe system when the end cap is positioned on a cladding of the insulated pipe system.

6. The apparatus of claim 1 wherein the flexible body is made of silicon or plastic.

7. The apparatus of claim 1 wherein the flexible band is made of metal or plastic.

8. The apparatus of claim 1 wherein the sealant seals both the first side and the second side of the flexible body to the pipe.

9. The apparatus of claim 1 wherein the sealant is silicon.

10. A method of sealing an end cap on an insulated pipe system, comprising the steps of:
    providing an apparatus for sealing an end cap on an insulated pipe system, comprising:
        a flexible body having a top, a bottom, a first side and a second side, the top of the flexible body having an end cap receiver and a band groove, the band groove being positioned adjacent the first side of the flexible body, the bottom of the flexible body circumferentially engaging an exterior surface of a pipe, the flexible body being sealable to the pipe by a sealant, the end cap receiver accepting an edge of the end cap;
        a flexible band, the flexible band circumferentially engaging the band groove of the flexible body to hold the flexible body on the pipe, the flexible band being sized to fit within the band groove; and
        the end cap receiver having a first wall and a second wall, the first wall being positioned adjacent the second side of the flexible body and the second wall being positioned between the band groove and the first wall such that the edge of the end cap is slidable between the first wall and the second wall;
    positioning the flexible body around the pipe adjacent to an insulation and a cladding such that the end cap receiver is engageable by the end cap when the end cap engages the cladding;
    positioning the flexible band around the flexible body and within the band groove for holding the flexible body around the pipe;
    utilizing sealant on the first side and the second side of the flexible body to seal the flexible body to the pipe;
    positioning the end cap within the end cap receiver such that the end cap engages the end cap receiver and the cladding.

11. The method of claim 10 further comprising the step of using sealant in the end cap receiver.

12. The method of claim 10 wherein the end cap receiver has at least one tooth to hold the end cap within the end cap receiver.

13. The method of claim 12 wherein the end cap receiver has three teeth to hold the end cap within the end cap groove.

14. The method of claim 13 wherein two teeth or positioned on the first wall of the end cap receiver and one tooth is positioned on the second wall of the end cap receiver.

15. The method of claim 10 wherein the bottom of the flexible body circumferentially engaging a pipe such that the second side of the flexible body is positioned within the insulated pipe system when the end cap is positioned on the cladding.

16. The method of claim 10 wherein the flexible body is made of silicon or plastic.

17. The method of claim 10 wherein the flexible band is made of metal or plastic.

18. The method of claim 10 wherein the sealant seals both the first side and the second side of the flexible body.

19. The method of claim 10 wherein the sealant is silicon.

* * * * *